(12) United States Patent
Faraboschi et al.

(10) Patent No.: US 9,143,403 B2
(45) Date of Patent: Sep. 22, 2015

(54) AUTONOMOUS METRIC TRACKING AND ADJUSTMENT

(71) Applicant: Hewlett-Packard Development Company, L.P., Houston, TX (US)

(72) Inventors: Paolo Faraboschi, Sant Cugat del Valles (ES); Dejan S Milojicic, Palo Alto, CA (US); Dwight L Barron, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 13/921,343

(22) Filed: Jun. 19, 2013

(65) Prior Publication Data

US 2014/0379889 A1    Dec. 25, 2014

(51) Int. Cl.
H04L 12/24    (2006.01)
H04L 12/26    (2006.01)

(52) U.S. Cl.
CPC ........ *H04L 41/0823* (2013.01); *H04L 41/0896* (2013.01); *H04L 43/08* (2013.01)

(58) Field of Classification Search
CPC .................................................. H04L 41/0823
See application file for complete search history.

(56) References Cited

U.S. PATENT DOCUMENTS

| | | | |
|---|---|---|---|
| 3,725,864 A * | 4/1973 | Clark et al. ........................ | 710/6 |
| 5,313,616 A * | 5/1994 | Cline et al. ..................... | 717/127 |
| 7,703,100 B2 | 4/2010 | Davis et al. | |
| 7,802,071 B2 * | 9/2010 | Oved ............................. | 711/170 |
| 7,930,422 B2 * | 4/2011 | Freimuth et al. ............... | 709/234 |
| 7,953,903 B1 * | 5/2011 | Finkelstein et al. ............ | 710/14 |
| 8,099,316 B2 * | 1/2012 | Moukas et al. ............... | 705/7.29 |
| 2002/0065945 A1 * | 5/2002 | Calder et al. ................... | 709/313 |
| 2004/0034556 A1 * | 2/2004 | Matheson et al. ................ | 705/8 |
| 2006/0123253 A1 * | 6/2006 | Morgan et al. ................ | 713/300 |
| 2007/0005302 A1 * | 1/2007 | Graupner et al. ............. | 702/188 |
| 2007/0027985 A1 * | 2/2007 | Ramany et al. ............... | 709/224 |
| 2008/0198757 A1 * | 8/2008 | Dan et al. ....................... | 370/252 |
| 2008/0240154 A1 * | 10/2008 | Oved ............................ | 370/466 |
| 2008/0244167 A1 * | 10/2008 | Tolmie .......................... | 711/104 |
| 2009/0106571 A1 | 4/2009 | Low et al. | |
| 2009/0132704 A1 * | 5/2009 | Emuchay et al. ............. | 709/224 |
| 2009/0178032 A1 * | 7/2009 | Yang et al. ..................... | 717/151 |
| 2010/0199080 A1 * | 8/2010 | Kolb ................................. | 713/2 |
| 2011/0078227 A1 * | 3/2011 | McAloon et al. ............. | 709/201 |
| 2012/0290865 A1 | 11/2012 | Kansal et al. | |
| 2012/0324194 A1 * | 12/2012 | Jacobs et al. .................. | 711/170 |
| 2013/0055247 A1 | 2/2013 | Hiltgen et al. | |

(Continued)

OTHER PUBLICATIONS

Clough, "Metrics, Schmetrics! How Do You Track a UAV's Autonomy?", 2002.*

(Continued)

*Primary Examiner* — O. C. Vostal
(74) *Attorney, Agent, or Firm* — Hewlett-Packard Patent Department (57) ABSTRACT

Example embodiments relate to autonomous metric tracking and adjustment. In some examples, a computing node may include a processor to run a main operating system and an application that runs on top of the main operating system. The computing node may include a hardware-level controller that dynamically adjusts individual hardware components of the computing node via control signals that do not pass through the main operating system. The adjustments may be based on a target metric from a scheduling service external to the computing node and individual performance metrics from the computing node.

18 Claims, 6 Drawing Sheets

(56) References Cited

U.S. PATENT DOCUMENTS

| | | | |
|---|---|---|---|
| 2013/0085720 A1* | 4/2013 | Xie et al. | 703/1 |
| 2013/0205114 A1* | 8/2013 | Badam et al. | 711/207 |
| 2013/0227201 A1* | 8/2013 | Talagala et al. | 711/103 |
| 2013/0254660 A1* | 9/2013 | Fujioka | 715/707 |
| 2014/0164641 A1* | 6/2014 | Ye et al. | 709/235 |
| 2014/0201417 A1* | 7/2014 | Dalai et al. | 710/308 |

OTHER PUBLICATIONS

Woolley et al., "Real-time behavior-based robot control", 2010.*
Rizzo et al., "Transparent acceleration of software packet forwarding using netmap", 2012.*
Das et al., "Unifying Packet and Circuit Switched Networks", 2009.*
Stoess. J. et al., Energy Management for Hyperviser-based Virtual Machines, (Research Paper), Proceedings of the Technical Conference, Jun. 17-22, 2007.

* cited by examiner

AUTONOMOUS METRIC TRACKING AND ADJUSTMENT

BACKGROUND

A common goal of IT and application administrators of large infrastructures is to balance various performance goals, for example, such as maximizing the execution of tasks/operations and minimizing operating costs (e.g., energy/power consumption, etc.).

A distributed application is a software program that is composed of multiple individual parts running in a coordinated manner on multiple networked computing nodes. These parts may collectively contribute to a unified objective, such as serving web pages, running a distributed database, and running a high-performance computing (HPC) task.

BRIEF DESCRIPTION OF THE DRAWINGS

The following detailed description references the drawings, wherein.

DETAILED DESCRIPTION

As mentioned above, various parts of a distributed application may run on multiple computing nodes. Each of these parts may be referred to generally as an "application" running on its respective computing node. In order to balance various performance goals with respect to the distributed application, the computing nodes and related computing equipment, it may be desirable to monitor various performance metrics related to the various parts of the distributed application and, in response, adjust various aspects of the computing nodes.

Various techniques for monitoring distributed applications may require a software program or a virtual machine (e.g., referred to as an "agent") running on each computing node. For each computing node, the agent runs "on top" of the main operating system (OS) of the computing node, meaning that the agent accesses the resources (e.g., CPU, memory, storage, etc.) of the computing node via the main OS. The agent communicates with an application (e.g., part of a distributed application) of the same computing node to read performance indicators and metrics about the application. The agent communicates with a centralized scheduling server or with other agents of other computing nodes in a peer-to-peer manner. The scheduling server may receive performance indicators and metrics from each computing node and may implement a control loop to send and update control signals to the agents of the various computing nodes based on the performance indicators. For each computing node, the agent may modify hardware resources of its computing node (e.g., CPU, memory, storage, etc.) in response to signals from the application and the scheduling server. However, the agent modifies the hardware resources by communicating with the main OS. The agent may have supervisor-level privileges, allowing the agent to access and modify low-level protected settings and resources of the computing node.

The techniques just described may have various disadvantages. For example, the software agent may be intrusive and may drain resources that ideally may be reserved for the applications running on the computing node. First, the software agent may use valuable network traffic that otherwise may be available to the application. The communication between the software agent and the scheduling server is frequent and the agent may send many different performance indicators or metrics to the scheduling server. For example, in frequent intervals (e.g., every second), the agent may send metrics regarding CPU utilization, network utilization, application performance metrics and the like. Then, at various intervals, the software agent may receive control signals from the scheduling server regarding adjustments that should be made to various components of the computing node. All of this traffic to and from the agent travels via the same network as the network used by the application to perform various network tasks (e.g., referred to as the application network). Thus, this agent traffic adds "noise" and unpredictability to the application network, which may reduce the network performance for the applications of the various computing nodes. Next, the software agent may use valuable processing resources of the computing node that otherwise would be available to the application. Because the software agent and the application both sit on top of the main OS of the computing node, each uses the main processor(s) of the computing node to perform tasks. The software agent may expend processing resources by collecting performance metrics from the application and by parsing and implementing control signals from the scheduling server. The software agent may also represent a software quality and support burden since the agent has to be ported and tested to a large variety of computing environments. The software agent may also be a potential security and data privacy concern because the agent needs to be able to access low level protected resources with supervisor-level privileges.

The present disclosure describes autonomous metric tracking and adjustment. In various examples of the present disclosure, a computing node may include a hardware-level controller that may dynamically adjust individual hardware components via control signals that do not pass through the main operating system of the computing node. The adjustments may be based on a target metric from a scheduling service external to the computing node. The target metric may be used to indicate one or more performance goals, perhaps a tradeoff or balance of performance goals (e.g., quality of service and power/energy). The hardware-level controller may implement a control loop (e.g., an autonomous, closed control loop) that monitors metrics of the computing node and automatically and dynamically adjusts various aspects (e.g., hardware components) of the computing node to track, as closely as possible, the target metric. Various descriptions below may describe the solutions of the present disclosure as they may apply to managing parts of a distributed application. However, it should be understood that these descriptions may apply to various other scenarios where a computing node may manage its resources based on a target metric provided by an external service. Thus, for example, application 202 of FIG. 2 may, in some scenarios, not be part of a distributed application. Or, for example, the solutions provided herein may generally aim to monitor performance metrics of the computing node and adjust various aspects (e.g., hardware components) of the computing node. Thus, the specific example of a distributed application may be used to explain the various features of the present disclosure, and is not intended to be limiting.

The present disclosure may provide benefits over various techniques for monitoring distributed applications, e.g., those described above. For example, the autonomous metric tracking and adjustment described herein is implemented at the hardware level and thus does not require a software agent and does not execute commands via the main processor of the computing node. Additionally, the hardware-level controller may communicate with the scheduling server via a different network (e.g., management network) than the network used by applications to perform network related tasks (e.g., application network). Thus, the hardware-level controller may use little to no processing power of the computing node, and may use little to no network traffic on the application network, which minimizes the impact on the applications of the computing node. Additionally, because no software agent is required, the solution of the present disclosure may require no porting and testing to a large variety of computing environments. Additionally, because no software agent is required that needs to access low-level protected resources, the computing node may reduce the amount of software programs that may have supervisor-level privileges.

Figure 1:
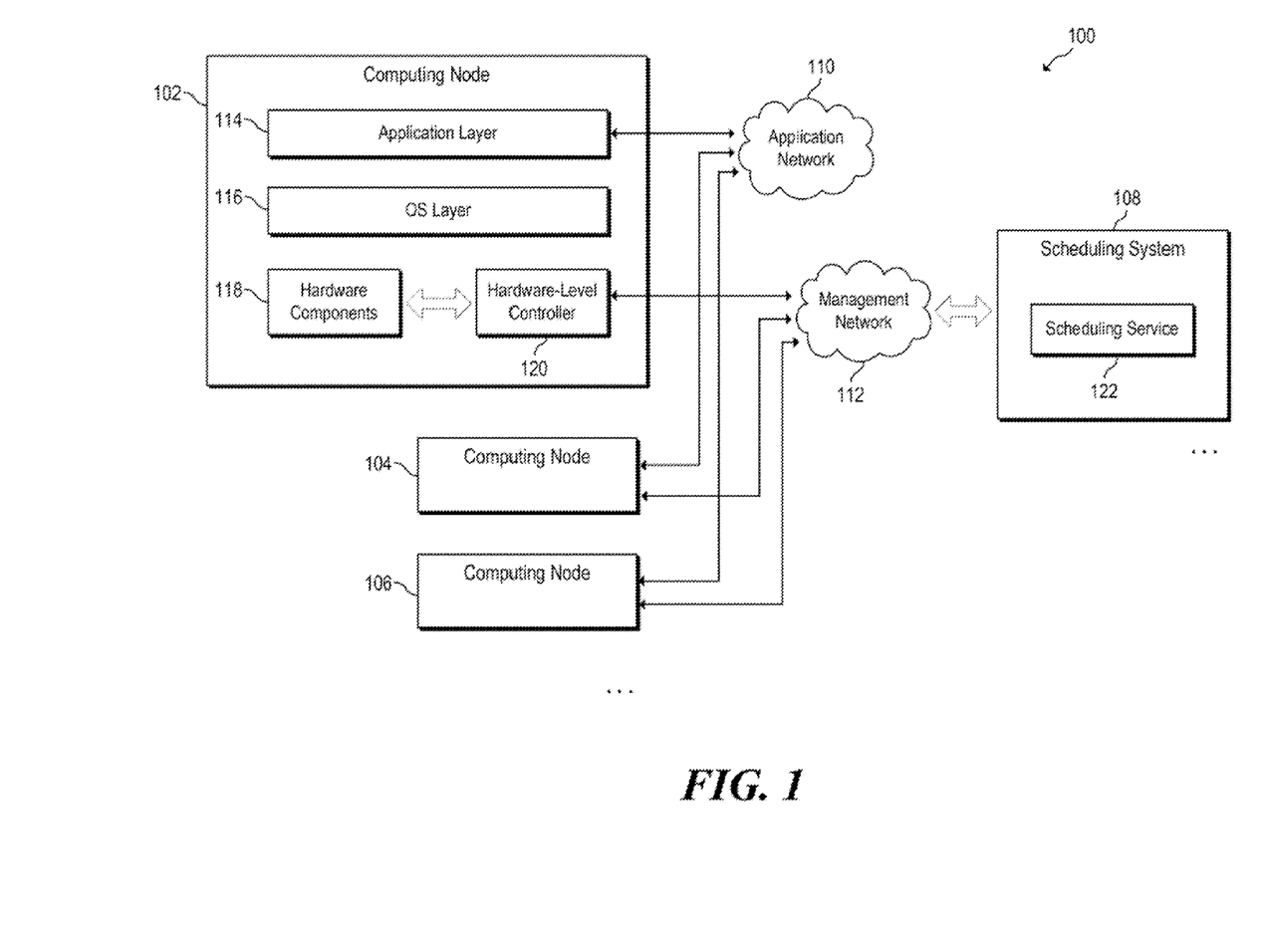
FIG. 1 is a block diagram of an example network setup where autonomous metric tracking and adjustment may be used in such a setup.

FIG. 1 is a block diagram of an example network setup 100 where autonomous metric tracking and adjustment may be used in such a setup. Network setup 100 may include a number of computing nodes (e.g., 102, 104, 106). Network setup 100 may include at least one scheduling system 108. Network setup 100 may include art application network 110 and a management network 112. Networks 110, 112 may each be a wired or wireless, and may each include any number of hubs, routers, switches or the like. Networks 110, 112 may each be, for example, part of the internet, at least one intranet and/or other type(s) of network(s).

Computing nodes 102, 104, 106 may each be any computing device that is capable of running applications and communicating with various networks. Each computing node (e.g., 102) may include an application layer 114, an OS layer 116 and a hardware layer, which may include hardware components 118 and a hardware-level controller 120. Applications may run at the application layer, and may communicate with application network 110. Hardware-level controller 120 may communicate with management network 112, and in turn with scheduling system 108 to, among other things, provide an observed metric and receive a target metric, as described in more detail below.

Scheduling system 108 may be implemented as at least one computing device, for example, any computing device capable of communicating with computing nodes via at least one network (e.g., 112). In some examples, scheduling system 108 may be implemented as more than one computing device, for example, computing devices that are in communication with each other (e.g., via a network). In these examples, the computing devices may operate together and provide a unified service to users. In these examples, the computing devices of the scheduling system may be separate devices, perhaps geographically separate. The term "system" may be used to refer to a computing environment that includes one computing device or more than one networked computing device.

Scheduling system 108 may include a scheduling service 122 that may communicate (e.g., via network 112) with computing nodes to, among other things, receive observed metrics from the various computing nodes and send target metrics to the various computing nodes, as described in more detail below. Scheduling service 122 may monitor the progress of a distributed application (e.g., with parts running on various computing nodes such as computing node 102). Scheduling service 122 may periodically receive observed metrics from the various computing nodes and may determine whether adjustments should be made based on the observed metrics. Scheduling service 122 may periodically send target metrics to the various computing nodes, which may be used by the computing nodes to adjust various aspects of the computing node.

Figure 2:
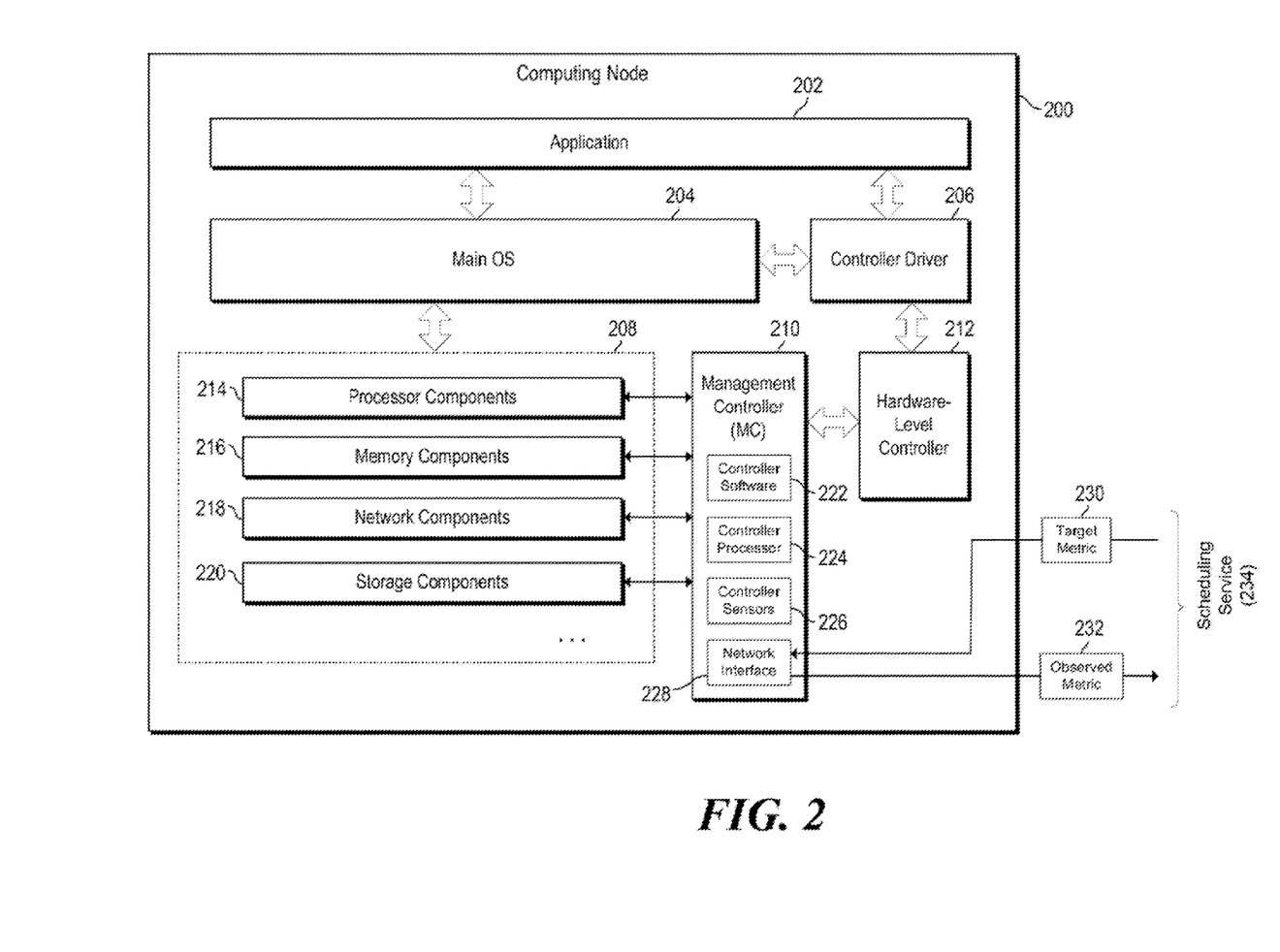
FIG. 2 is a block diagram of an example computing node for autonomous metric tracking and adjustment.

FIG. 2 is a block diagram of an example computing node 200, where computing node 200 may be similar to computing nodes 102, 104, 106 of FIG. 1, for example. Computing node 200 may include an application 202, which may run at an application layer (e.g., similar to application layer 114 of FIG. 1). Computing node 200 may include a main operating system (OS) 204 and a controller driver 206, which may each run at an OS layer (e.g., similar to OS layer 116 of FIG. 1). Computing node 200 may include hardware components 208 (e.g., similar to hardware components 118 of FIG. 1). Computing node 200 may include a management controller (MC) 210. Computing node 200 may include a hardware-level controller 212 (e.g., similar to hardware controller 120 of FIG. 1).

Application 202 may be, but need not be, a part of a distributed application. In this respect, various computing nodes similar to computing node 200 (e.g., a cluster of computing nodes) may run applications that are similar to application 202, and these applications may operate together. A cluster of computing nodes may be shared by multiple applications. However, various descriptions herein, in order to provide a clear disclosure, may describe a single application (e.g., 202) and a hardware-level controller (e.g., 212) that is dedicated to that single application. It should be understood however, that the techniques provided herein may accommodate multiple applications running on the same computing node. Application 202 may perform various tasks by communicating with a network (e.g., an application network), similar to application network 110 of FIG. 1, for example.

Main OS 204 controls the resources of computing node 200. Main OS 204 may support and monitor applications (e.g., 202). Main OS 204 may detect, allocate and tune (e.g., via frequency and voltage tuners) the hardware resources (e.g., hardware components 208) of the computing node. As can be seen in FIG. 2, example hardware components (e.g., in 208) include processor components 214 (e.g., CPU, CPU cores, etc.), memory components 216 (e.g., DRAM), network components 218 and storage components 220. Processor components 214 may include a main processor or set of processors that perform the vast majority of all the operations and computations of the computing node 200. Such a main processor may run the main OS 204, application 202 (and any other applications in the application layer) and controller driver 206. As described in more detail below, the main processor may not, however, run operations and computations of MC 210, which may have its own processor 224.

Management controller (MC) 210 also referred to as a baseboard management controller) may be a specialized service processor that monitors the state (e.g., physical state) of various hardware components (e.g., 208) of computing node 200. MC 210 may be located on the motherboard or main circuit board of the computing node. MC 210 may include a number of sensors 226 to monitor various hardware components (e.g., 208). Sensors 224 may measure various metrics (e.g., internal physical variables) of the hardware components such as temperature, humidity, power-supply voltage, fan speeds and communications parameters. MC 210 may have access to various tuning controls of hardware components 208, and thus may tune various hardware components. For example, MC 210 could turn off a CPU (or a core), tune a CPU (or a core) to run faster/slower, change bus/core clock multipliers, change DRAM timing, change network link speed, and the like. MC 210 may include its own processor 224, and may run its own software 222. Thus, the operations and calculations performed by MC 210 may not detract from the processing power of the main processor(s) (e.g., in 214) of the computing node 200, which as described above run the main OS 204. In some examples, MC 210 is only accessible to the main OS 204 via a controller driver (e.g., 206), as described in more detail below.

In some embodiments, MC 210 may be implemented external to computing node 200, for example, as a chassis management controller (CMC). A CMC may operate in a manner similar to the MC described herein, but it may control multiple computing nodes, for example, computing nodes that are physically aggregated together in a rack or chassis. In these examples, the hardware-level controller 212 described herein, and its various features may be implemented in the CMC or near the CMC (e.g., external to computing node 200). Thus, for example, the hardware-level controller may be implemented in a rack or chassis, and may implement at least one "inner" control loop as described herein. In general, the functionality of the MC and/or hardware-level controller may be similar whether the MC and/or hardware-level controller is implemented internal to computing node 200 or external.

MC 210 may include a network interface 228, which play allow MC 210 to access a management network (e.g., management network 112 of FIG. 1). In various existing computing nodes, the management network may be used to allow communication between a system administrator and a management controller such that the system administrator may perform basic administrative tasks (e.g., to power cycle certain hardware components on, etc.). Additionally, if certain hardware components monitored by the management controller exhibit metrics that stray outside of acceptable ranges, the administrator may be notified via the management network. The management network, for various reasons (e.g., security) is typically a separate network from the application network. As described in more detail below, the present disclosure may take advantage of this existing management network and the fact that it is separate from the application network to implement a hardware-level controller 212 that causes minimal or no noise to the application network. Thus, in the examples of the present disclosure, network interface 228 may receive a target metric 230 from a scheduling service 234 and may send an observed metric 232 to the scheduling service.

Hardware-level controller 212 may communicate with MC 210. In some examples, hardware-level controller 212 is included within MC 210. Hardware-level controller 212 may communicate with the network interface 228 of MC 210, for example, to receive a target metric 230 and send an observed metric 232, as described more below. In this respect, hardware-level controller 212 may communicate with a scheduling server 234 via the management network to perform autonomous metric tracking and adjustment while causing minimal or no noise to the application network. Hardware-level controller 212 may communicate with the sensors 226 of MC 210, for example, to receive various metrics (e.g., internal physical variables) of the hardware components (e.g., 208) of computing node 200. Hardware-level controller 212 may communicate with MC 210 to, in turn, access various tuning controls of hardware components 208, and thus tune various hardware components. Thus it can be seen that hardware-level controller 212 may extend the functionality of MC 210.

Hardware-level controller 212 may be implemented as one or more hardware devices including electronic circuitry for implementing the functionality described herein. In addition or as an alternative, hardware-level controller 212 may be implemented as a series of Instructions encoded on a machine-readable storage medium and executable by a processor of MC 210 (e.g., processor 224). Thus, it can be seen that the operations and computations performed by hardware-level controller 212 may require minimal or no processing power of the main processor(s) (e.g., in 214) of computing node 200. Additionally, hardware-level controller 212 may interfere minimally or not at all with the main OS 204 and/or application 202. In short, hardware-level controller 212 may transparently perform its tasks (e.g., monitoring application progress, etc.) while causing minimal to no performance overhead.

Hardware-level controller 212 may communicate with a controller driver 206, to access main OS 204 and application 202. As described in more detail below, hardware-level controller 212 may communicate with controller driver 206 to access various hardware and OS metrics and counters. Additionally controller driver 206 may allow application 202 to send information (e.g., "unit of work" information, such as number of web pages served or number of steps completed in a scientific simulation) directly to hardware-level controller 212. Hardware-level controller 212 may invoke controller driver 206 periodically, for example, based on a sampling frequency established through the standard hardware monitoring parameters of MC 210. Main OS 204 may also perform monitoring functions according to the same sampling frequency. For example, main OS 204 could monitor a number of executed instructions at a granularity of 10,000, so that every 10,000 instructions the relevant information (e.g., various performance counters) are available to hardware-level controller 212. Alternatively or in addition, every 10,000 instructions, for example, main OS 204 could copy the relevant information (e.g., values of various performance counters) to a memory area (e.g., in 216), and then hardware-level controller may access the memory area via MC 210.

Hardware-level controller 212 may track various performance metrics of computing node 200, for example, with the goal of tracking the performance or computing progress of application 202. Each hardware-level controller in the various computing nodes may be responsible for tracking a part of a distributed application that is running on the computing node. As described in more detail below, hardware-level controller 212 may autonomously track these performance metrics, meaning that hardware-level controller 212 may automatically cause adjustments of various components of computing node 200 (e.g., by altering various tuning controls of hardware components 208) based on performance metrics observed by the hardware-level controller.

Hardware-level controller 212 may track the performance or computing progress (e.g., rate of execution of tasks) of application 202 in various ways. For example, hardware-level controller 212 may analyze indirect metrics and/or direct metrics. Indirect metrics may be performance indicators and metrics from components other than application 202 (e.g., from main OS 204 or hardware components 208) that may indicate or suggest the computing progress of application 202. Direct metrics may be performance indicators that are sent directly from application 202 to hardware-level controller 212, as described in more detail below.

Hardware-level controller 212 may receive indirect metrics from the various hardware components 208 of computing node 200. For example, hardware-level controller 212 may communicate with MC 210 (e.g., with sensors 226) to receive performance metrics (e.g., network traffic, CPU utilization, disk traffic, etc.) from the hardware components. Hardware-level controller 212 may then correlate such performance metrics with the progress of application 202. In other words, hardware-level controller 212 may use the performance metrics to approximate the progress (e.g., rate of execution) of application 202. Hardware-level controller 212 may include logic, lookup tables or other knowledge (e.g., knowledge gained from experiments, tests, statistical analysis, etc.) that determines how various hardware performance metrics may correlate to progress of application 202. For example, if application 202 serves web pages, and if hardware-level controller 212 is attempting to determine the progress of application 202 in this task, hardware-level controller 212 may know that a certain amount of network traffic (e.g., X Kb) may correspond to one served web page on average. Thus, hardware-level controller 212 may receive network traffic metrics (e.g., from network components 218) and use those metrics to indirectly estimate the number of web pages that have been served by application 202. Hardware-level controller 212 may receive various other types of hardware metrics as well for example, CPU voltage and frequency settings (e.g., from 214), core/bus frequency multipliers, DRAM timing training at power up (e.g., from 216), voltage regulator regime, network link speed (e.g., from 218), and local storage subsystem hardware RAID parameters (e.g., from 220). Hardware-level controller 212 may correlate one or more of these metrics with computing progress of application 202.

Hardware-level controller 212 may also receive indirect metrics from main OS 204, for example, by communicating with controller driver 206. Main OS 204 may communicate with application 202 and may maintain various performance counters. Hardware-level controller 212 may have access to various performance metrics and counters maintained by main OS 204. Similar to the hardware metrics described above, these OS metrics may be used by hardware-level controller 212 to approximate the progress of application 202.

Hardware-level controller 212 may receive direct metrics (e.g., application-level metrics, counting events, etc.) from application 202, for example, via controller driver 206. Hardware-level controller 212 may then use the direct metrics to compute the progress (e.g., rate of execution) of application 202. In order to provide direct metrics, programmers of application 202 may insert specific programming calls or annotations into the code of application 202. These programming calls may be able to communicate with controller driver 206, and, in turn, with hardware-level controller 212. These programming calls may be provided by an application programming interface (API), software development kit (SDK) or the like. Each programming call may indicate when at least one event of application 202 has occurred. Such programming calls may provide more accurate information about the computing progress of application 202 than do the indirect metrics described above. In some examples, these direct metrics may augment the indirect metrics, and hardware-level controller 212 may analyze direct and indirect metrics. As one example of direct metrics, and continuing with the web page serving example from above, a programmer of application 202 may insert a programming call into the code of application 202 to signal each time a new web page has been generated. As another example, in a database application, a programming call may signal when a transaction has been committed. As yet another example, in a high performance computing (HPC) application, a programming call may signal when the next time step iteration of a physics simulation has completed. By allowing programmers to provide application-level information directly to hardware-level controller 212, applications may be more precisely monitored and hardware-level controller 212 may better optimize tune various components of computing node 200.

Figure 3A:
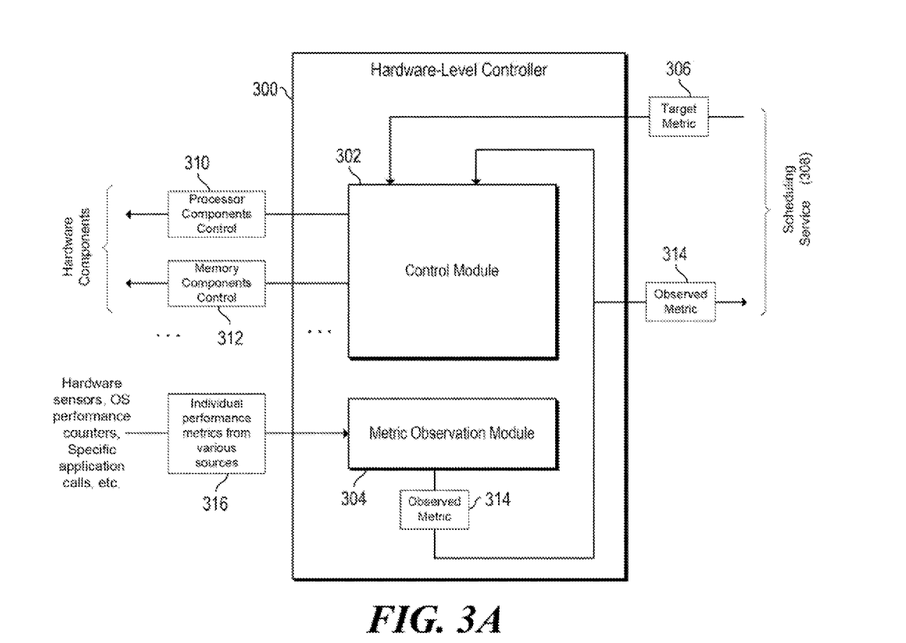
FIG. 3A is a block diagram of an example hardware-level controller for autonomous metric tracking and adjustment.

FIG. 3A is a block diagram of an example hardware-level controller 300, where hardware-level controller 300 may be similar to hardware-level controller 212 of FIG. 2, for example. Hardware-level controller 300 may include a number of modules, for example, modules 302, 304. These modules may be implemented as one or more hardware devices including electronic circuitry for implementing the functionality described herein. In addition or as an alternative, these modules may be implemented as a series of instructions encoded on a machine-readable storage medium and executable by a processor of a MC associated with hardware-level controller 300 (e.g., MC 210 and processor 224).

Hardware-level controller may use a control loop (e.g., a closed control loop) to adjust/tune various components of a computing node based on various performance metrics of the computing node and a target metric received from an external scheduling service. A closed control loop may use "control theory," which deals with the behavior of dynamic systems with inputs. A general closed loop system may receive an external input from an external system called a "reference." Then the closed loop (e.g., via a controller) may attempt to alter various control signals, settings and the like of the system in order to cause at least one output variable of the system to track the reference as closely as possible over time. In general, the closed loop may determine proper corrective action for the system based on the reference and various internal system metrics.

In the example of FIG. 3A, target metric 306 may be a "reference" signal coming from the external scheduling service 308, and hardware-level controller 300 (via control module 302) may attempt to alter various control signals (e.g., 310, 312) of the computing node in order to cause at least one output variable (e.g., observed metric 314) to track the reference (target metric 306) as closely as possible over time. In general, hardware-level controller 300 may determine proper corrective action for the computing node based on target metric 306 and various internal performance metrics (e.g., 316) of the computing node. As can be seen in FIG. 3A, the output (e.g., observed metric 314) of hardware-level controller 300 is fed back into control module 302, which allows control module 302 to autonomously and dynamically compensate for changes to the output.

The present disclosure describes a solution that may include two control loops from the perspective of each computing node. A first ("outer") control loop may be implemented in the scheduling service 308. This control loop may receive as input various observed metrics (e.g., 314) from various computing nodes, and may, based on these inputs, periodically determine performance goals (e.g., target metrics such as 306) for the various computing nodes. This control loop may execute less frequently than the "inner" control loops in the computing nodes (discussed more below). A second ("inner") control loop may be implemented in the computing node. Thus, each computing node in the network setup (e.g., 100 of FIG. 1) may implement an inner control loop. The inner control loop may execute more frequently than the outer control loop. Thus, a majority of the corrective action/adaptation of the computing nodes may be determined in the computing nodes, and it may be said that the metric tracking and adjustment described herein is autonomous. The inner control loop may be implemented in the hardware-level controller 300, as described in more detail herein. Thus, the inner control loop is executed at the hardware level, and not at the application level, as may be the case with various software agents described above.

Control module 302 may receive an input (e.g., target metric 306) from external scheduling service 308. Target metric 306 may be, depending on a determination made by the scheduling service (e.g., directed by an administrator), various types of performance targets/goals. For example, target metric 306 may be a power/energy target, a target that specifies a number of executed tasks, a target that specifies usage of various resources (e.g., a quality of service metric) or the like. Some target metrics may indicate that certain metrics should be optimized. Other target metrics may serve a more managerial purpose, for example, indicating a tradeoff between various metrics (e.g., a performance level to track at minimum power, or a power level to track at maximum performance).

In some scenarios, it may not be optimal for the distributed application as a whole for each node to optimize a certain metric. Instead, it may be better for the distributed application as a whole if individual computing nodes execute tradeoffs between various metrics. As a specific example, in various network setups, the speed of global computations of the distributed application may be dependent on the slowest computing node, and thus instructing one computing node to perform certain tasks faster may not be beneficial if another slower node is already slowing down the global computations. In such a case, computing nodes other than the slowest node may be instructed to track some other metric (e.g., power). In this respect, it can be seen that a scheduling service may manage the various computing nodes with various target metrics in order to achieve a global goal (e.g., total cost of ownership, overall throughput of a computation, profitability of an infrastructure, or the like). The scheduling server may implement a variety of higher-level heuristics which may be, for example, dependent on a business scenario. For example, in a high performance computing (HPC) environment, the scheduling server might aim to maximize an application's throughput while keeping the power consumption within a certain cap. As another example, in a commercial environment, the scheduling server might aim to minimize TCO (total cost of ownership) without violating certain service level agreements, and so on. An administrator may be able to configure/set these target metrics (e.g., 306) that are sent to various computing nodes. Thus, the present disclosure may offer flexibility in setting and configuring performance targets.

Target metric 306 may be a single value, for example, such that the control loop of hardware-level controller 300 may be implemented as a single input (e.g., external input), multiple output (SIMO) control loop. A SIMO control loop may offer benefits such as a unified control and the ability to break the control loop down into smaller components. Target metric 306 may be a single value even though target metric 306 may indicate that the control loop should attempt to track (e.g., trade-off among) various metrics. For example, target metric 306 may indicate the goal of "maximum application throughput+capped power consumption." In order to create a single value, target metric 306 may be generated based on an equation or function (e.g., a linear combination) that receives various metrics as inputs. Then, scheduling service 308 may communicate with hardware-level controller 300 to indicate how target metric 306 should be interpreted, such that hardware-level controller 300 may attempt to track target metric 306 as closely as possible. Because scheduling service 308 may send a single-value target metric (e.g., 306) and receive a single-value observed metric (e.g., 314), the network traffic between the computing node and the scheduling service may be reduced when compared to various other techniques that may use a software agent that sends individual statistics and receives individual control signals at frequent intervals.

Control module 302 may also receive a feedback input (e.g., internal input) that is the observed metric 314 output of metric observation module 304. Control module may use the feedback input to perform a comparison to target metric 306. Then, control module 302 may adjust various hardware control signals (e.g., 310, 312) based on the comparison. More details regarding this comparison and how it may result in control signal adjustments may be described below.

Control module 302 may output multiple control signals (e.g., multiple outputs of an SIMO control loop). For example, control module 302 may output a control signal 310 for processor components (e.g., 214). As another example, control module 302 may output a control signal 312 for memory components (e.g., 216). Various other control signal outputs for various other hardware components (e.g., in 208) may be adjusted by module 302. In general, various hardware components (e.g., CPUs, memory, network interfaces, storage, etc.) may have discrete, adjustable power states. In these various states, the components may remain fully operational, but their performance (e.g., execution of tasks, frequency/voltage scaling, power levels, etc.) may vary depending on the state. Each hardware component may have at least one control signal that may be used to change the state of the hardware component. Control module 302 may tap into these control signals (e.g., as signals 310, 312, etc.). Control module 302 may include circuitry, a routine, an algorithm or the like that may generate control signals (e.g., 310, 312) based on the external target metric 306 input and the feedback input (observed metric 314).

Metric observation module 304 may monitor/receive various performance metrics 316 from various sources within the computing node, for example, hardware components, main OS performance counters, specific application calls and the like. Metric observation module 304 may generate an observed metric 314 (e.g., a single-value metric) based on these various performance metrics. Metric observation module 304 may create a single-value observed metric in a manner similar to that described above with regard to target metric 306. For example, observed metric 314 may be generated based on an equation or function (e.g., a linear combination) that receives various metrics as inputs. In some, situations, such an equation or function may be the same or similar function as an equation/function used by scheduling server 308 to generate target metric 306. Metric observations module 304 may receive an indication from scheduling service 308 regarding how observed metric 314 should be constructed based on various performance metrics. Alternatively, each computing node may be individually configured to specify how observed metric 314 should be constructed based on various performance metrics. Observed metric 314 may then be compared to target metric 306 to attempt to track target metric 306 as closely as possible.

In some situations, hardware-level controller 300 may be able to track the progress of multiple applications (e.g., similar to application 202 of FIG. 2). For example, hardware-level controller 300 may include multiple control loops (e.g., multiple control modules, multiple metric observations modules, etc.), for example, one control loop per application. As another example, a single control loop of hardware-level controller 300 may accommodate multiple applications. In general, a single control loop may most effectively track a single application, but in some scenarios, performance metrics from multiple applications may be fed into a single control loop. For example, the multiple applications may be prioritized such that at any one time, performance metrics from a single application are being fed into the control loop. As another example, performance metrics from multiple applications may be combined (e.g., using a function or equation) to provide aggregated performance metrics to the control loop. Various descriptions herein may describe a single application and a single control loop, but it should be understood that the techniques and solutions described herein may be expanded to multiple applications and/or multiple control loops.

Figure 3B:
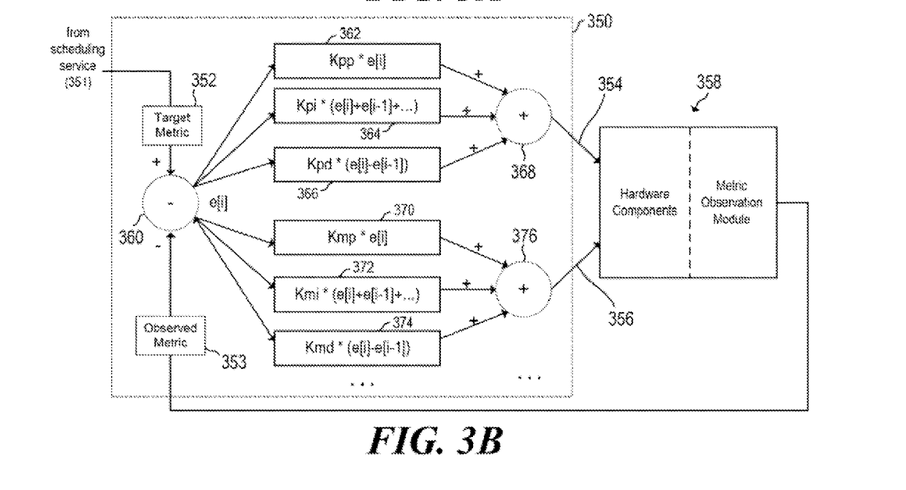
FIG. 3B is a block diagram of an example hardware-level controller for autonomous metric tracking and adjustment.

FIG. 3B is a block diagram of an example hardware-level controller 350, where hardware-level controller 350 may be similar to hardware-level controller 300 of FIG. 3A, for example. FIG. 3B may describe more details (e.g., equations, configuration, etc.) of an example control loop that may be implemented in a hardware-level controller. Hardware-level controller 350 may receive one external input (e.g., target metric 352) from an external scheduling service 351, e.g., similar to target metric 306 and scheduling service 308 of FIG. 3A. Hardware-level controller 350 may receive one feedback input (e.g., observed metric 353), e.g., similar to observed metric 314 of FIG. 3A. Hardware-level controller 350 may output a number of control signals (e.g. 354, 356), e.g., similar to control signals 310, 312 of FIG. 3A. These control signals (e.g., 354, 356) may be sent to various hardware components of the computing node, and then the computing node may observe various performance metrics of the computing node, as described above. In FIG. 3B, the hardware components and metric observation module are indicated generally by black box 358, which may output observed metric 353. Thus, the control loop of hardware-level controller 350 may be seen in the target metric and observed metric as inputs, to the control signals 354, 356 as intermediate outputs and then the observed metric 353 as a feedback input. Additionally, as described above, this control loop may be characterized as a single input multiple output (SIMO) control loop where target metric 352 may be the single input and control signals 354, 356, etc, may be the multiple outputs.

Hardware-level controller 350 may implement a control loop using various types of controllers and/or feedback mechanisms/techniques. As one example, hardware-level controller 350 may use a proportional-integral-derivative (PID) controlling technique. It should be understood however, that this is just one example, and various other techniques of closed-loop control may be used. A PID technique measures an error between an observed metric and a target metric. Then, the error is used to tune or adjust the system. In the specific example of FIG. 3B, hardware-level controller 350 may compare (e.g., via subtractor 360) observed metric 353 to target metric 352 to generate an error (e[i]). Such an error may be computed at various intervals, for example, at a regular, discrete sampling interval. Thus, the 'i' in the error symbol e[i] may represent the sampling interval during which the particular error was calculated. During each sampling interval, the error (e[i]) may be used by multiple control algorithms or control circuits, e.g., one control algorithm/circuit for each hardware component that is to be controlled by hardware-level controller 350. For example, blocks 362, 364, 366 and summation unit 368 may be included in a control algorithm/circuit for a processor component. Likewise, blocks 370, 372, 374 and summation unit 376 may be included in a control algorithm/circuit or a memory component.

The following will describe the control algorithm/circuit consisting of blocks 362, 364, 366 and summation unit 368 as one example. Other control algorithms/circuits for other hardware components may function in a similar manner. According to the PID technique, three values are calculated based on the error (e[i])—a proportional value 362, an integral value 364 and a derivative value 366. The proportional value indicates a present error; the integral value indicates an accumulation of past errors; and the derivative value indicates a prediction of future errors based on a current rate of change. The proportional value may be based on a proportional parameter for the particular hardware component (e.g., Kpp for a processor component). The integral value may be based on an integral parameter for the particular hardware component (e.g., Kpi for a processor component). The derivative value may be based on a derivative parameter for the particular hardware component (e.g., Kpd for a processor component).

These parameters may affect how the control signals (e.g., 354, 356) change in response to error, and may in turn affect how observed metric 353 changes in response to error. More particularly, these parameters may affect how observed metric 353 may approach target metric 352 (e.g., whether and how much observed metric overshoots the target metric, oscillates around the target metric, converges to the target metric, etc.). These parameters may also affect how long it takes observed metric 353 to come within an acceptable range of target metric 352. These parameters may be configurable and may be set in various ways, for example, by the scheduling service 351, by the hardware-level controller 350, by an administrator, or by a combination of these and/or other sources. As a specific example, an administrator may configure the computing node to behave a certain way in response to the error. As another specific example, the scheduling service may indicate how the computing node should behave.

For each hardware component (e.g. a processor component for blocks 362, 364, 366 and summation unit 368), the proportional, integral and derivative values for the hardware component may be aggregated (e.g., via summation unit 368) to create a single control signal (e.g., 354). In other words, for example, control signal 354 may be a weighed sum of the PID values 362, 364 and 366. The control signal 356 (e.g., for a memory component) and various other control signals (for various other hardware components) may be computed in a similar manner. These control signals may then control their respective hardware components.

In some examples of the present disclosure, and referring to FIG. 2, computing node 200 (e.g., via hardware-level controller 212) may synchronize metric information that is sent to scheduling service 234. Various other computing nodes that send metric information to the scheduling service may perform similar synchronization. When a scheduling service (e.g., 234) collects individual metrics (e.g., 232) from various computing nodes (e.g., 200) in a distributed system, it may be important to ensure that the information is time-synchronized (e.g., within a certain error tolerance). Time-synchronized information may allow the scheduling service to perform various routines in an organized manner, routines such as extract global aggregated statistics, ordering commands and/or target metrics to various computing nodes and the like. Hardware-level controller 212 may automatically synchronize metric information that is sent to scheduling service 234 (e.g., by inserting network timestamps to tag data packets).

Figure 4:
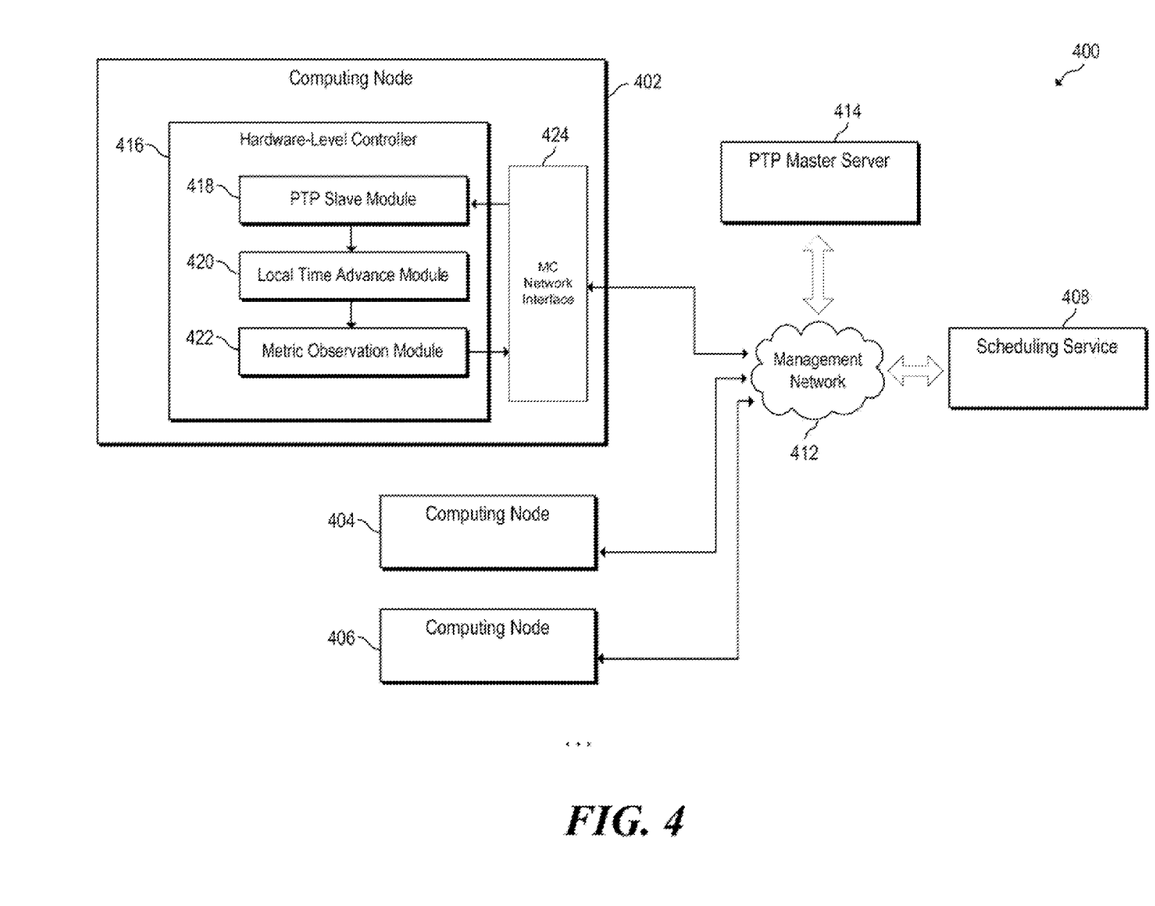
FIG. 4 is a block diagram of an example network setup where autonomous metric tracking and adjustment may be used in such a setup.

FIG. 4 is a block diagram of an example network setup 400 where autonomous metric tracking and adjustment may be used in such a setup. Network setup 400 may be similar to network setup 100 of FIG. 1, for example. For example, network setup 400 may include a number of computing nodes (e.g., 402, 404, 406), a scheduling service 422, an application network (not shown in FIG. 4) and a management network 412. Additionally, network setup 400 may include a PTP master server 414 or other type of time server. In the example of FIG. 4, computing node 402 may include a hardware-level controller 416, which may include a PTP slave module 418, a local time advance module 420 and a metric observation module 422. Modules 418, 420 and 422 may be implemented as one or more hardware devices including electronic circuitry for implementing the functionality described herein. In addition or as an alternative, these modules may be implemented as a series of instructions encoded on a machine-readable storage medium and executable by a processor of a MC associated with hardware-level controller 416 (e.g., MC 210 and processor 224).

Hardware-level controller 416 may be similar to other hardware-level controllers discussed herein (e.g., 212, 300, 350). Hardware-level controller 416 may automatically synchronize metric information (e.g., output by metric observation module 422) before sending the metric information to scheduling service 408. Hardware-level controller 416 may use a network synchronization protocol such as precision time protocol (PTP) or network time protocol (NTP). The following descriptions may use the PTP protocol, but it should be understood that various other protocols may be used. The PTP protocol may rely on a master-slave arrangement where a PTP master server (e.g., 414) may maintain a clock time. Then various slave servers or components may adjust their own clock times based on the clock time of the PTP master server. The PTP master server may send messages via a network in order to instruct the PTP slaves to update their clock times. In the example of FIG. 4, hardware-level controller may include a PTP slave module that may update/maintain a clock time based on messages (e.g., time-update message) received from PTP master server 414. PTP master server 414 may be connected to the management network 412, and messages from the PTP master server may be received by the management controller (MC) network interface 424 (similar to network interface 228 of FIG. 2, for example) and passed to PTP slave module 418.

PTP slave module 418 may receive time-update messages form PTP master server 414 at various times (e.g., at regular intervals). Thus, at various times (e.g., at the moment a time-update message arrives), PTP slave module 418 may have the "correct" current time as specified by PTP master server 414. Then at times that fall between time-update messaging intervals, the hardware-level controller 416 (e.g., via local time advance module 420) may locally advance the time received by the PTP slave module, in order to keep the local time as close as possible to the clock time of the PTP master server 414. In some examples, local time advance module 420 may be included within PTP slave module 418. Thus, between module 418 and module 420, hardware-level controller 416 may always have a synchronized time. It can be seen, that utilizing the scheme just described, each computing node (e.g., 402, 404, 406) in the network setup may have the same synchronized time (e.g., within a small defined error).

Metric observation module 422 (e.g., similar to module 304 of FIG. 3A) may receive current synchronized times from module 420 and/or module 418. Metric observation module 422 may "timestamp" packets of information with the current synchronized times before sending such packets of information to scheduling service 408 (e.g., via MC network interface 424 and management network 412). As one example, metric observation module may collect various performance metrics from various sources of the computing node and may compute a single-value observed metric as described herein. This collection and computation may take some time, during which, PTP slave module 418 may receive at least one time-update message. If time exists between when a time-update massage is received by module 418 and when module 422 is ready to send the single-value observed metric to scheduling service 408, local time advance module 420 may advance the time to maintain the current local time. Then, when metric observation module 422 is ready to send an observed metric, it may insert or timestamp the packet(s) of the observed metric with the current local time. Then, metric observation module 422 may send the time stamped packets to the scheduling service. The scheduling service 408 may use the timestamps to maintain a consistent and synchronized view of the distributed computing node environment and/or the distributed application.

Metric observation module 422 may maintain or receive a programmable aggregation frequency, which may specify how often module 422 should create a single-value observed metric form various collected performance metrics. This aggregation frequency may be specified by the scheduling service, e.g., such that the scheduling service can specify how often it receives observed metrics. This metric may be specified by a system administrator, e.g., via scheduling service 408 or directly via the various computing nodes.

As described above, hardware-level controller 416 may be implemented at the hardware level, and likewise, the various modules (e.g., 418, 420, 422) of hardware-level controller 416 may be implemented at the hardware level. Additionally, as described above, hardware-level controller 416 may communicate directly with MC network interface 424. Thus, hardware-level controller 416 may perform time synchronization at the hardware level, without communicating with the main OS of the computing node, without causing any drag or intervention to the application layer and without causing any performance drain on the main processor(s) of the computing node.

Figure 5:
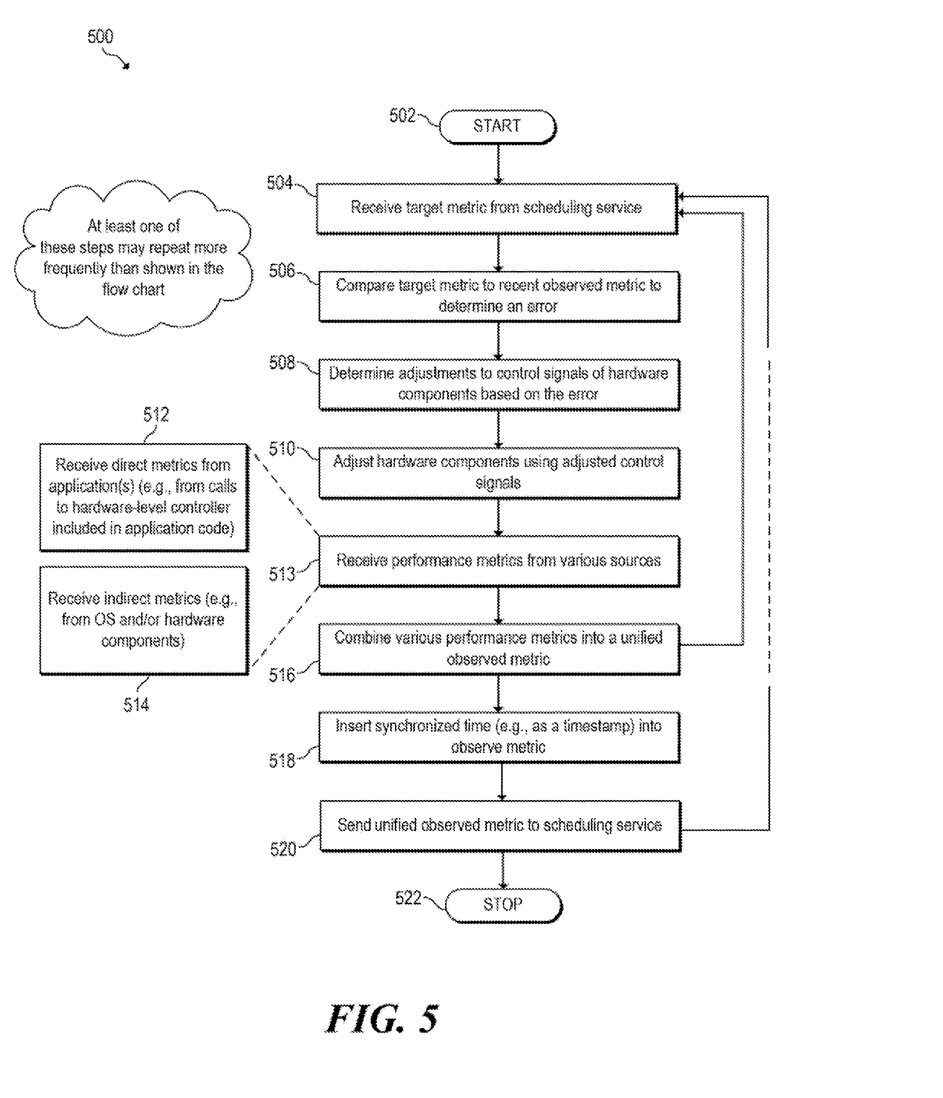
FIG. 5 is a flowchart of an example method for autonomous metric tracking and adjustment.

FIG. 5 is a flowchart of an example method 500 for autonomous metric tracking and adjustment. Although execution of method 500 is described below with reference to computing node 200 of FIG. 2, part or all of method 500 may be executed by at least one other suitable computing device, for example, computing node 600 of FIG. 6. Method 500 may be implemented in the form of executable instructions stored on a machine-readable storage medium, such as storage medium 620 of FIG. 6. In some examples of the present disclosure, one or more steps of method 500 may be executed substantially concurrently or in a different order than shown in FIG. 5. In other examples of the present disclosure, method 500 may include more or less steps than are shown in FIG. 5. In some examples, one or more of the steps of method 500 may, at certain times, be ongoing and/or may repeat.

Method 500 may start at step 502 and continue to step 504, where a computing node (e.g., computing node 200 of FIG. 2) may receive a target metric from a scheduling service (e.g., 234). At step 506, the computing node may compare the target metric to a recent observed metric to determine an error. At step 508, the computing node may determine adjustments to control signals of various hardware components based on the error, as described in more detail above. At step 510, the computing node may adjust the hardware components using the adjusted control signals. At step 513, the computing node may receive performance indicators from various sources of the computing node, as described in more detail above. FIG. 5 shows two examples of where these performance metrics may come from. For example, at step 512, the computing node may receive direct metrics from at least one application (e.g., from calls to hardware-level controller included in the application code). As another example, at step 514, the computing node may receive indirect metrics (e.g., from the main OS and/or hardware components). At step 516, the computing node may combine the various performance metrics into a unified observed metric. At step 518, the computing node may insert a synchronized time (e.g., as a timestamp) into the observed metric, as described above. At step 520, the computing node may send the unified observed metric to the scheduling service. Method 500 may eventually continue to step 522, where method 500 may stop.

Method 500 (and portions of method 500) may repeat to form one or more control loops. For example, at step 516, once a unified observed metric is determined, the observed metric may be fed back into earlier steps of method 500 as shown by FIG. 5, for example, to form an "inner" control loop such that at step 506, the target metric may be compared to the observed metric. Additionally, once the observed metric is sent to the scheduling service at step 520, the scheduling service may use that observed metric to generate an update target metric, which may be fed back into step 504 of method 500, for example, to form an "outer" control loop. In general, at various times, at least one of the steps of method 500 may repeat more frequently than shown in FIG. 5.

Figure 6:
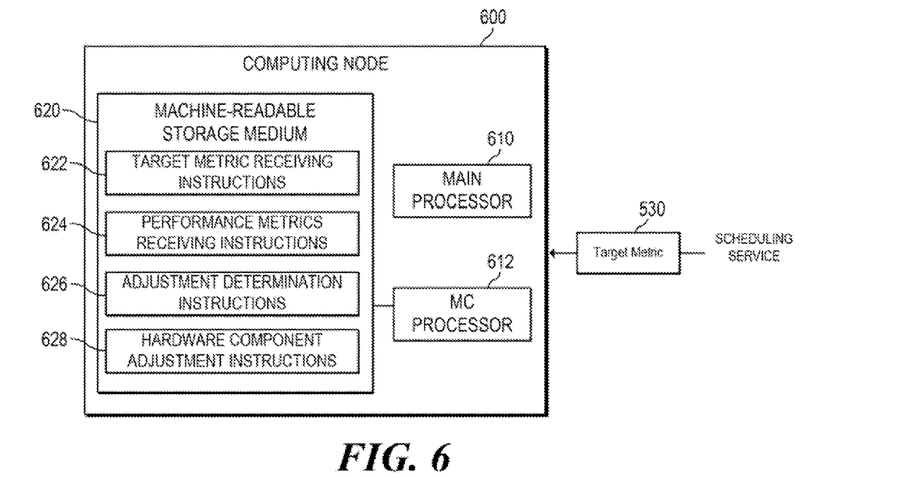
FIG. 6 is a block diagram of an example computing node for autonomous metric tracking and adjustment.

FIG. 6 is a block diagram of an example computing node 600 for autonomous metric tracking and adjustment. Computing node 600 may be any computing device capable of running applications and communicating with various networks. More details regarding an example computing node may be described above, for example, with respect to computing node 200 of FIG. 2. In the embodiment of FIG. 6, computing node 600 includes a main processor 610, a separate processor 612 (e.g., a processor of a management controller/MC) and a machine-readable storage medium 620.

Processor 610 may be one or more central processing units (CPUs), CPU cores, microprocessors, and/or other hardware devices suitable for retrieval and execution of instructions stored in a machine-readable storage medium that is separate from machine-readable storage medium 620. Processor 612 may be one or more central processing units (CPUs), CPU cores, microprocessors, and/or other hardware devices suitable for retrieval and execution of instructions stored in machine-readable storage medium 620. Processor 612 may be included in a management controller (MC) of computing node 600. Processor 612 may fetch, decode, and execute instructions (e.g., instructions 622, 624, 626, 628) to, among other things, perform autonomous metric tracking and adjustment. With respect to the executable instruction representations (e.g., boxes) shown in FIG. 6, it should be understood that part or all of the executable instructions included within one box may, in some examples, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within a computing device (e.g., 600), as shown in FIG. 6. Machine-readable storage medium 620 may be included in a management controller (MC) and/or a hardware-level controller of computing node 600. In this situation, the executable instructions may be "installed" on the computing device. Alternatively, machine-readable storage medium 620 may be a portable (e.g., external) storage medium, for example, that allows a computing device (e.g., 600) to remotely execute the instructions or download the instructions from the storage medium. In this situation, the executable instructions may be part of an installation package. As described below, machine-readable storage medium 620 may be encoded with executable instructions to perform autonomous metric tracking and adjustment.

Target metric receiving instructions 622 may receive (e.g., via hardware-level controller 212 of computing node 200), a target metric (e.g., 230) from a scheduling service (e.g., 234) external to the computing node. Performance metrics receiving instructions 624 may receive (e.g., via hardware-level controller 212) individual performance metrics (e.g., 316 of FIG. 3) from the computing node. Adjustment determination instructions 626 may determine (e.g., via hardware-level controller 212) adjustments to be made to individual hardware components (e.g., 208) of the computing node based on the target metric and the individual performance metrics. Hardware component adjustment instructions 628 may dynamically adjust (e.g., via hardware-level controller 212) the individual hardware components (e.g., 208) using control signals (e.g., 310, 312) that do not pass through a main operating system (e.g., 204) of the computing node.

Figure 7:
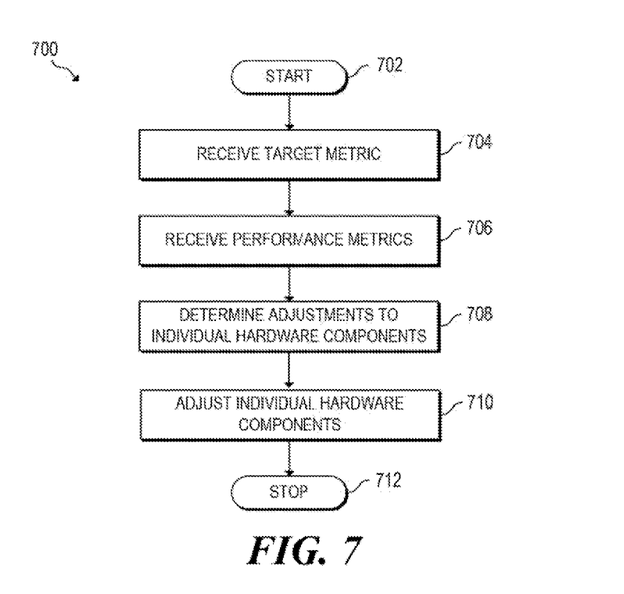
FIG. 7 is a flowchart of an example method for autonomous metric tracking and adjustment.

FIG. 7 is a flowchart of an example method 700 for autonomous metric tracking and adjustment. Method 700 may be executed by a computing node, for example, similar to computing node 600 FIG. 6. Method 700 may be executed by other suitable systems and/or computing devices, for example, computing node 200 of FIG. 2. Method 700 may be implemented in the form of executable instructions stored on a machine-readable storage medium, such as storage medium 620, and/or in the form of electronic circuitry. In some examples of the present disclosure, one or more steps of method 700 may be executed substantially concurrently or in a different order than shown in FIG. 7. In other examples of the present disclosure, method 700 may include more or less steps than are shown in FIG. 7. In some examples, one or more of the steps of method 700 may, at certain times, be ongoing and/or may repeat.

Method 700 may start at step 702 and continue to step 704, where a hardware-level controller of computing node 600 may receive (e.g., via instructions 622) a target metric from a scheduling service external to the computing node. At step 706, the hardware-level controller may receive (e.g., via instructions 624) individual performance metrics from the computing node. At step 708, the hardware-level controller may determine (e.g., via instructions 626) adjustments to be made to individual hardware components of the computing node based on the target metric and the individual performance metrics. At step 710, the hardware-level controller may dynamically adjust (e.g., via instructions 628) the individual hardware components using control signals that do not pass through a main operating system of the computing node. Method 700 may eventually continue to step 712, where method 700 may stop.

It will be appreciated that the previous description of the disclosed examples is provided to enable any person skilled in the art to make or use the present disclosure. Various modifications to these examples will be readily apparent to those skilled in the art, and the general principles defined herein may be applied to other examples without departing from the spirit or scope of the disclosure. Thus, the present disclosure is not intended to be limited to the examples shown herein but is to be accorded the widest scope consistent with the principles and novel features disclosed herein.

The invention claimed is:

1. A computing node capable of autonomous metric tracking and adjustment, the computing node comprising:
   a processor to run a main operating system;
   an application that runs on top of the main operating system; and
   a hardware-level controller that dynamically adjusts individual hardware components of the computing node via control signals that do not pass through the main operating system, wherein the adjustments are based on a target metric from a scheduling service external to the computing node and individual performance metrics from the computing node.

2. The computing node of claim 1, wherein the hardware-level controller is further to:
   generate a unified observed metric based on the individual performance metrics; and
   cause the unified observed metric to be sent to the scheduling service such that the scheduling service can update the target metric based on the unified observed metric and observed metrics from other computing nodes.

3. The computing node of claim 1, wherein the hardware-level controller is integrated in a management controller of the computing node.

4. The computing node of claim 1, wherein the hardware-level controller executes tasks, including the dynamic adjustment, using a processor of the management controller that is separate from the processor that runs the main operating system.

5. The computing node of claim 1, wherein the application communicates with computing devices external to the computing node via a first network and the hardware-level controller communicates with the scheduling service via a second network.

6. The computing node of claim 1, wherein the hardware-level controller uses a closed control loop to adjust the control signals based on a comparison between the target metric and a unified observed metric that is based on the individual performance metrics, wherein the hardware-level controller adjusts the control signals to converge the unified observed metric to the target metric.

7. The computing node of claim 1, wherein the individual performance metrics include performance metrics from the main operating system.

8. The computing node of claim 7, wherein the performance metrics from the main operating system include direct performance metrics that are sent from the application to the hardware-level controller, wherein the performance metrics sent from the application are generated based on programming calls to the hardware-level controller included in the code of the application.

9. The computing node of claim 7, wherein the performance metrics from the main operating system include indirect performance metrics that approximate a progress or rate of execution of the application, wherein the indirect performance metrics include operating system performance counters.

10. The computing node of claim 1, wherein the individual performance metrics include indirect performance metrics from the individual hardware components that approximate a progress or rate of execution of the application.

11. A method for autonomous metric tracking and adjustment executed in a computing node, the method comprising:
    receiving, via a hardware-level controller of the computing node, a target metric from a scheduling service external to the computing node;
    receiving, via the hardware-level controller, individual performance metrics from the computing node;
    determining, via the hardware-level controller, adjustments to be made to individual hardware components of the computing node based on the target metric and the individual performance metrics; and
    dynamically adjusting, via the hardware-level controller, the individual hardware components using control signals that do not pass through a main operating system of the computing node.

12. The method of claim 11, wherein the target metric is a single value that is generated based on multiple target performance goals.

13. The method of claim 12, further comprising receiving, from the scheduling service, an indication regarding how the single-value target metric is to be interpreted.

14. The method of claim 11, further comprising:
    generating, via the hardware-level controller, a unified observed metric based on the individual performance metrics; and
    causing the unified observed metric to be sent to the scheduling service such that the scheduling service can update the target metric based on the unified observed metric and observed metrics from other computing nodes.

15. The method of claim 14, further comprising:
    comparing the unified observed metric to the target metric to determine an error; and
    using the error for the determining of the adjustments to be made to the individual hardware components.

16. The method of claim 14, further comprising:
    receiving a network synchronized time from a time server;
    locally advancing the time until the unified observed metric is ready to be sent to the scheduling service; and
    inserting a timestamp based on the time into the unified observed metric before the unified observed metric is sent to the scheduling service, wherein the scheduling service uses the timestamp and timestamps of observed metrics of other computing nodes to synchronize information received from and sent to the computing node and the other computing nodes.

17. A system capable of autonomous metric tracking and adjustment, the system comprising:
    a computing node disposed in a rack or chassis with other computing nodes, the computing node having a processor to run a main operating system, and an application that runs on top of the main operating system; and
    a chassis management controller that is to adjust individual hardware components of the computing node and the other computing nodes in the rack, wherein the chassis management controller includes, for the computing node, a hardware-level controller that dynamically adjusts individual hardware components of the computing node via control signals that do not pass through the main operating system, wherein the adjustments are based on a target metric from a scheduling service external to the chassis and individual performance metrics from the computing node.

18. The system of claim 17, wherein the hardware-level controller uses a closed control loop to adjust the control signals based on a comparison between the target metric and a unified observed metric that is based on the individual performance metrics, wherein the hardware-level controller adjusts the control signals to converge the unified observed metric to the target metric.

* * * * *